UNITED STATES PATENT OFFICE.

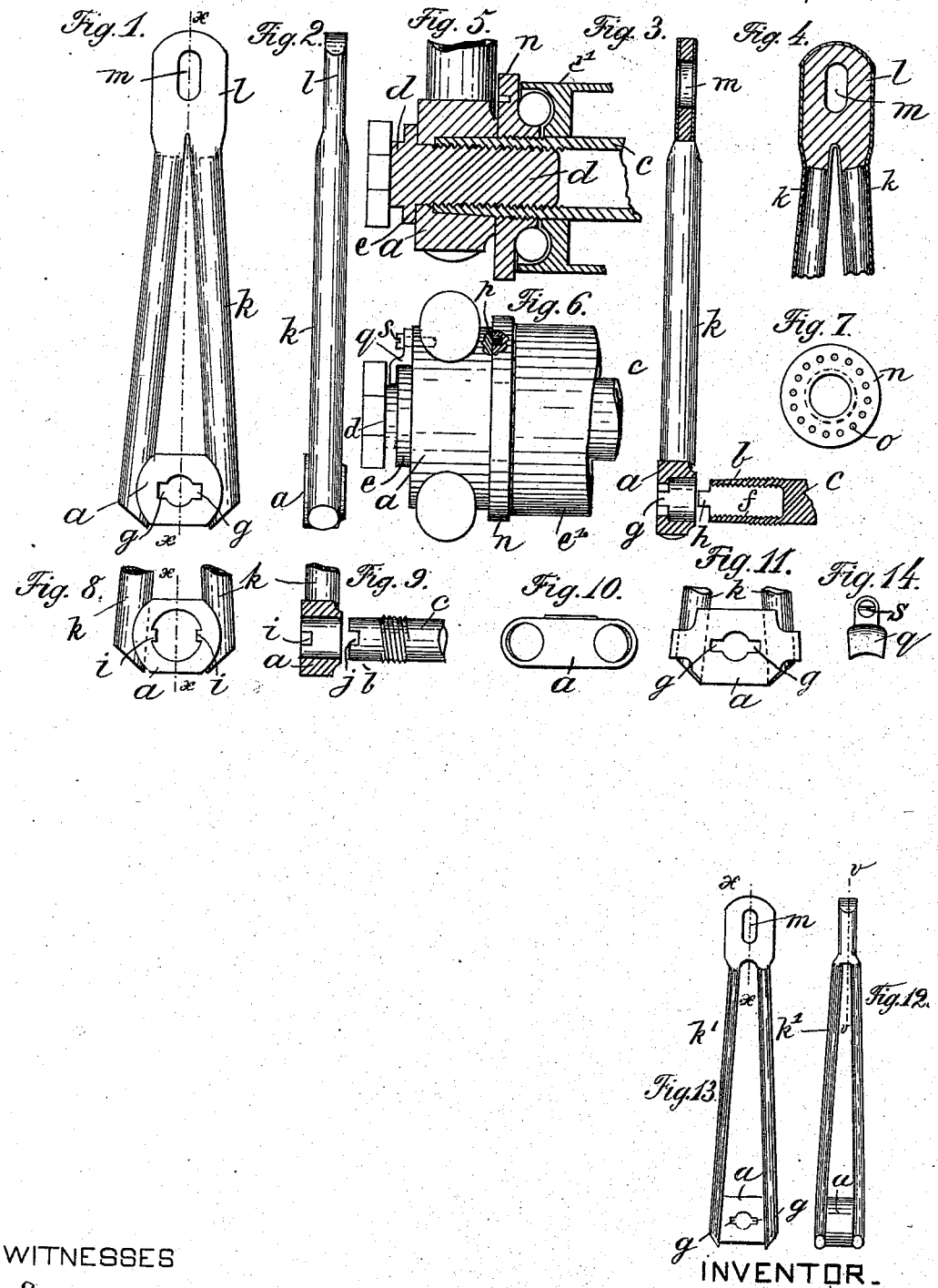

GUSTAF ADOLF LINDSTRÖM, OF NEW YORK, N. Y.

BICYCLE-CRANK.

SPECIFICATION forming part of Letters Patent No. 550,374, dated November 26, 1895.

Application filed January 24, 1895. Serial No. 535,997. (No model.)

*To all whom it may concern:*

Be it known that I, GUSTAF ADOLF LINDSTRÖM, a subject of the King of Sweden, and a resident of New York city, in the county and State of New York, have invented certain new and useful Improvements in Bicycle-Cranks, of which the following is a specification.

My invention consists of an improved construction of cranks for bicycles and other machinery, whereby it is feasible to utilize small light tubes or rods to produce cranks of equal strength with less weight, as hereinafter described, reference being made to the accompanying drawings, in which—

Figure 1 is a side elevation of a bicycle-crank constructed according to my invention. Fig. 2 is an elevation of the same in a view at right angles to that of Fig. 1. Fig. 3 is an elevation, same as in Fig. 2, with the ends in section on line $x\,x$, Fig. 1, and with part of the shaft also sectioned lengthwise. Fig. 4 is a section of part of the outer or pedal end of the crank in the plane of its travel. Fig. 5 is a section of the boss of the crank, part of the shaft, and one of the ball-bearings, and also the means of securing the crank to the shaft, the scale being considerably enlarged. Fig. 6 is a side view of the devices of Fig. 5 with the crank in end view, also on a larger scale, and also with a part broken out. Fig. 7 is an outside face view of the cone of the ball-bearing. Fig. 8 is a side view of the boss end of the crank, showing a different form of key-lugs for connecting the crank and shaft. Fig. 9 is a section of the part of the crank shown in Fig. 8 on line $x\,x$ and a side view of part of the shaft adapted for the key-lugs of said Fig. 8. Fig. 10 is an end view, and Fig. 11 a side view, of the boss end of the crank slightly modified in construction. Fig. 12 is a plan view, and Fig. 13 a side view, of the crank in a construction in which four smaller tubes or rods are used. Fig. 14 is a side view of a keeper to the screw which connects the crank and shaft, the purpose of which is to facilitate the disconnection of the crank and shaft when they are to be separated.

For the boss of the crank I take a suitable block of steel or other approved material, as $a$, and bore it for reception of the end portion $b$ of the crank-shaft $c$ and for the connecting-screw $d$, by which, together with key-lugs of any approved form and the head of the screw or a collar $e$, the crank and the shaft are to be connected, the screw being fitted through the boss into the screw-threaded bore or socket $f$ of the shaft suitably to draw them firmly together. The bore of the boss $a$ and the said part $b$ of the shaft are preferably tapered a little to draw tight. In Figs. 1, 3, and 11 the boss $a$ is represented with notches $g$ in the reduced portion of the bore at the outside of the boss and the shaft with key-lugs $h$ to engage them. In Figs. 8 and 9 the boss $a$ is represented with key-lugs $i$ in its bore and the shaft with notches $j$ for said lugs, and it will be seen that various well-known forms of devices of like character may be employed for keying the crank and shaft together, wherefore I do not limit myself to any particular contrivance of them. To opposite edges of this block, suitably grooved in the lengthwise direction of the crank, as shown in Fig. 1 and various other figures, or bored, as shown in Figs. 10 and 11, I apply one or more tubes or rods, as $k$, securely brazing them in the grooves or bores, said rods being of suitable length for the arm of the crank and converging at the pedal end in a solid terminal $l$, of suitable form and dimensions for the slot $m$ for the pedal-spindle to be made in it, said terminal being made of a flat block welded or brazed to the ends of the rods or tubes, and in the case of the tubes being used being inserted within the tubes, which are suitably flattened and slit open, and the edges of the split parts of the respective tubes are joined and brazed together along the line $x\,x$ when the crank-arm consists of two tubular members, as in Fig. 1, and when consisting of four members there will also be joined and soldered edges of the tubes along the edges of the solid terminal $l$. The shaft may be tubular throughout its entire length or it may be solid in the middle portion, with sockets bored in the ends to receive the screws $d$.

The cone $n$ is made to screw on the axle for tightening up the ball-bearings, and it has a series of holes $o$ bored in the face fronting the crank, and the crank carries a stud-pin $p$, which engages one of said holes when secured in position and locks the cone against shifting.

The screw $d$ is made with a collar $e$, which is engaged with a keeper $q$, attached to the outside of the boss $a$ by a screw $s$ or other suitable means, which when the keeper is screwed up tight locks the screw $d$ fast and prevents it from working loose, and the keeper serves also, when slacked off sufficiently to permit the screw $d$ to be turned, to prevent the screw from backing out and thus to cause it to force the shaft out of the taper hole of the boss, wherein it lodges so tightly when screwed up that considerable power is required to force it loose.

In Figs. 12 and 13 I represent four rods or tubes $k'$ for the arm of the crank, as it may be made when desired, the rods or tubes being correspondingly smaller. In such case the boss $a$ will have duplicate grooves instead of the single grooves in which to lay and braze the rods or tubes, as is obvious. The split edges of the two tubes of each side will be similarly joined and brazed along the line $v$ $v$ on the edges of the terminal piece $l$, as well as along line $x$ $x$.

The part marked $e'$ represents part of the shaft-supporting and the ball-bearing box. It is to be connected to the frame in the ordinary or any approved way, which need not be shown or described.

I claim—

1. The improved crank consisting of the solid boss, solid terminal of the pedal end and two or more rods or tubes forming the arm, the said boss being grooved for reception of the rods or tubes and said rods or tubes laid and brazed in the grooves, and said rods or tubes also brazed to the pedal terminal substantially as described.

2. The improved crank consisting of the solid boss, solid terminal of the pedal end, and two or more tubes forming the arm, the said boss being grooved for reception of the tubes, and said tubes laid and brazed in the grooves, and the pedal terminals inserted and brazed in the split end portions of the arm tubes substantially as described, Signed at New York city, in the county and State of New York, this 17th day of January, A. D. 1895.

GUSTAF ADOLF LINDSTRÖM.

Witnesses:
 W. J. MORGAN,
 A. P. THAYER.